United States Patent Office 3,231,605
Patented Jan. 25, 1966

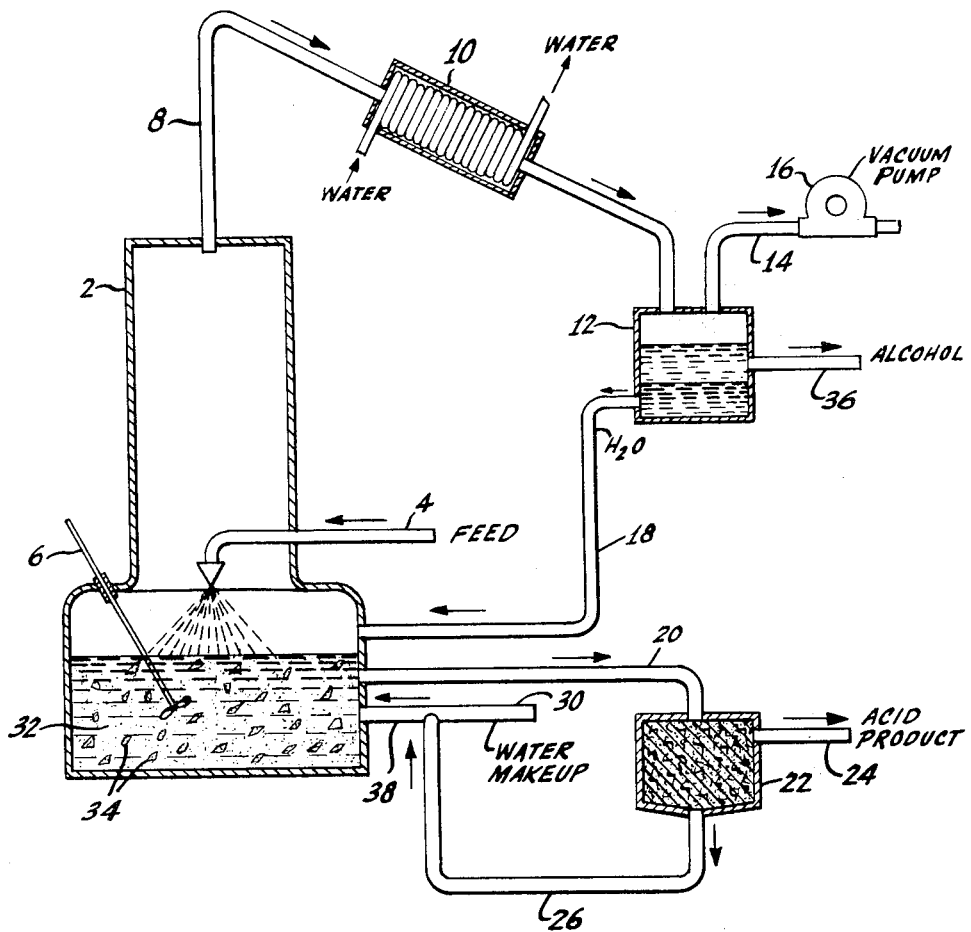

3,231,605
METHOD FOR DISTILLING AND RECOVERING ORGANIC PEROXY ACIDS
John H. Blumbergs, Highland Park, N.J., assignor to FMC Corporation, New York, N.Y., a corporation of Delaware
Filed Mar. 27, 1963, Ser. No. 268,424
5 Claims. (Cl. 260—502)

This invention relates to the distillation and recovery of organic peroxy acids from their reaction mixtures, and more particularly, to those organic peroxy acids produced by the reaction of their precursor organic acyl halides or organic acyl anhydrides with aqueous alkaline hydrogen peroxide solutions.

In my copending application Serial No. 268,243, filed March 27, 1963, entitled "Method for Producing and Recovering Organic Peroxy Acids," there is taught a method for producing and recovering organic peroxy acids which have been produced by the reaction of an organic acyl halide or organic acyl anhydride with an aqueous mixed alkali metal peroxide solution in the presence of a solvent which is made up of water and a tertiary alcohol. The tertiary alcohol is employed as a reaction promoter. The reaction is illustrated by the following equation:

where:
R is an organic radical
X is a halogen atom
M is an alkali metal.

In this process, the organic peroxy acid is recovered in a tertiary alcohol layer separate from the aqueous portion of the reaction mixture. This alcohol layer is made up of either tertiary butyl alcohol or tertiary amyl alcohol in which is dissolved the organic peroxy acid along with minor amounts of inorganic salts.

Attempts to separate and recover, by conventional distillation, both the tertiary alcohol and the heat-sensitive labile, organic peroxy acids which are solids at room temperature have not proven successful. Serious decomposition of the organic peroxy acid occurs during distillation and subsequent crystallization even when conducted under subatmospheric pressures and at relatively low temperatures, i.e. below 40° C. In addition, the organic peroxy acid recovered after distillation has been found to be contaminated with both potassium and sodium inorganic salts. This is undesirable, since these salts frequently reduce the stability of the crystallized product on storage.

The separation of the organic peroxy acids from their tertiary alcohol solution can be carried out by a series of selective extractions with other organic solvents, e.g. benzene, followed by separation of the alcohol layer from the organic solvent, and subsequent evaporation of the organic solvent to yield the peroxy acid crystals. However, this procedure is commercially undesirable because it requires repeated extractions with inevitable solvent losses, utilizes special extraction equipment, and is expensive to operate. Further, a distillation step must be performed to recover the organic solvent from the peroxy acid which further adds to the expense of recovering the peroxy acid.

It is an object of the present invention to recover high molecular weight organic peroxy acids including aromatic, cycloaliphatic and aliphatic peroxy acids which are solids at room temperature from a tertiary alcohol solvent, in which minor amounts of inorganic salts are present, without employing organic extractants, and without undue loss of the active oxygen of the peroxycarboxylic acid.

These and other objects will be apparent from the following disclosure.

I have now found that higher molecular weight peroxycarboxylic acids which are solids at room temperature can be recovered in a pure state from a mixture containing either tertiary amyl alcohol or tert-butanol, minor amounts of inorganic salts and the peroxycarboxylic acid without undue decomposition of the acid, by introducing the above mixture into a pool of aqueous liquid maintained in a distillation zone, heating the aqueous liquid to not higher than about 40° C. while maintaining the distillation zone under subatmospheric pressure, removing a vaporous mixture of the tertiary alcohol and water overhead whereby the peroxycarboxylic acid crystallizes in the aqueous pool, removing the resultant aqueous slurry containing the peroxycarboxylic acid from the distillation zone, and separating the peroxycarboxylic acid crystals from the aqueous liquor.

This purification procedure is most advantageous in that the peroxycarboxylic acid crystals are recovered in high yields in a one-step operation, free of both non-volatile inorganic salts which remain dissolved in the aqueous liquid, and the tertiary alcohol. The resultant peroxycarboxylic acid crystals have been found to have excellent resistance to decomposition in the pure form in which they are recovered.

In the operation of this process, the feed stream is made up of a solution of the peroxycarboxylic acid dissolved in either tertiary amyl alcohol or tert-butanol. The tertiary alcohol also contains a small amount of water and minor amounts of inorganic salts such as sodium chloride, potassium chloride, sodium sulfate, potassium sulfate, sodium phosphate and potassium phosphate. This solution is fed into a conventional distillation unit in which there is maintained a pool of water at a temperature of from about 15–40° C. The still is placed under subatmospheric pressure by means of a vacuum pump within the range of about 12 to about 60 mm. Hg and preferably at that pressure which will permit the water to boil at the selected temperature. When the peroxycarboxylic acid solution which is fed into the still contacts the water, the tertiary alcohol portion quickly evaporates at the subatmospheric pressures within the still, and distills overhead together with water vapor. This vaporous mixture is condensed for reuse and recovery of the tertiary alcohol. The distillation residue, which is made up of the peroxycarboxylic acid and the non-volatile salts remains with the residual water. The non-volatile salts which are water-soluble go into solution while the relatively insoluble peroxycarboxylic acid crystallizes and forms a crystal slurry. These crystals are separated from the water by a simple filtration, centrifuge, or other separating means. The water which is recovered from the filter or centrifuge normally is returned to the base of the distillation unit.

The distillation can be carried out either in batch or in a continuous process. In a continuous process, the feed stream is continuously added to the still along with make-up water to maintain the water at a given level. A stream of the still bottoms is continuously removed and filtered to recover the acid crystals and the aqueous liquor is returned to the still. Since the aqueous liquor which remains after separation of the acid crystals contains some dissolved salt, a portion is purged to prevent the build up of the inorganic salts in the water. In addition, a pure water make-up must be provided to supply water to replace that which is not returned to the still.

The distillation is conducted at temperatures of from about 15–40° C. and preferably at 15–30° C. Temperatures above 40° C. i.e. 60° C. can be employed with the more stable peroxy acids. However, with most peroxy acids, decomposition becomes excessive at the higher temperatures, i.e. above 40° C. and therefore, these temperatures are not desirable. Distillation at temperatures lower than 15° C. is feasible but a higher vacuum must be applied to the still and the rate of distillation generally is slower. Accordingly, the temperature employed is that which will avoid excessive decomposition of the acid and which does not require an excessively high vacuum.

In carrying out the distillation with tert-butanol as the alcohol solvent, this alcohol forms an azeotrope with water, whose boiling point is slightly lower than the boiling point of the tert-butanol alone. Upon condensation of the overhead vaporous mixture of tert-butanol and water, a homogeneous solution is obtained. Since this tert-butanol-water distillate does not separate into layers, it is generally recycled to the reactor which is used to produce the peroxycarboxylic acid, to utilize the alcohol content of the distillate.

In carrying out the present process with tertiary amyl alcohol, the overhead vapors are made up of a water-tertiary amyl alcohol azeotrope which boils considerably below the boiling point of either water or the tertiary amyl alcohol alone. Upon condensation of the overhead vapors from the still, the tertiary amyl alcohol and the water form separate immiscible layers in the collecting vessel. The alcohol layer is removed for recycle to the reactor for producing additional peroxycarboxylic acid while the water layer is recycled to the base of the still.

The present process can best be illustrated by reference to the attached drawing which is a schematic representation of one form of apparatus used in the process where the solvent is tertiary amyl alcohol.

A tertiary amyl alcohol solution containing a peroxycarboxylic acid, minor amounts of inorganic salts and some water, is fed through line 4 into still 2. The feed contacts a pool of heated water 32 agitated by stirring means 6. The still is heated by conventional means, not shown, while a subatmospheric pressure is maintained within the still by vacuum pump 16 connected to the receiver 12 through line 14. Upon contact with the heated water, the tertiary amyl alcohol evaporates and the mixture of water and tertiary amyl alcohol vapors is removed from the still through overhead line 8, passes through condenser 10 where the mixture is condensed and is collected in receiver 12. The distillate stratifies in receiver 12 into an upper alcohol layer and a lower aqueous layer, the alcohol is removed from the receiver 12 through line 36 for reuse, while the water is removed from receiver 12 through line 18 and returned into the base of still 2.

The peroxycarboxylic acid which has limited solubility in water remains in the distillation residue and forms insoluble crystals in the aqueous pool. The inorganic salts in the residue, by contrast, are water-soluble and are dissolved in the aqueous pool. The acid crystals 34 form a slurry which is drawn off through line 20 into a separator 22 which may be either a filter or a centrifuge or other convenient means for separating liquid from solids. The peroxycarboxylic acid crystals are removed through means 24 while the aqueous effluent is passed through line 26 and line 38, back to the still. Since the aqueous effluent which is returned to the still contains a small proportion of salt, it should be periodically purged in part by means not shown to prevent the build up of inorganic salt. Make-up water required to maintain the level of the pool in the still is added through conduits 30 and 38 into still 2.

The drawing illustrates the method of operating when tertiary amyl alcohol is employed in the feed stream; operation with tert-butanol is carried out in a similar manner except that no separation of layers into alcohol and water is obtained in receiver 12. In this instance, line 18 is not utilized. Instead, the level of the aqueous pool in the still is maintained by adding make-up water through conduit 30 and a mixture of tert-butanol and water is removed from conduit 36 instead of a pure alcohol fraction.

The peroxycarboxylic acids which have been found operative according to the present invention are those that are solids at room temperature and are relatively water insoluble. Those peroxycarboxylic acids which have a solubility not exceeding about 2% by weight in water have been found readily recoverable by the present invention in high yields. However, as the water solubility of the peroxycarboxylic acid increases proportionally more acid dissolves in the water and less is recovered in crystalline form. If the aqueous liquor obtained after removal of the peroxycarboxylic acid crystals is returned to the water in the still in a continuous process, the amount of acid which is lost can be minimized.

The peroxycarboxylic acids which may be recovered, may contain either aromatic, cycloaliphatic or aliphatic residues. The residues may be unsubstituted or substituted groups such as halogens, $NO_2$, $C\equiv N$, or methoxy groups. Further, the aromatic and the cycloaliphatic groups can be substituted with aliphatic groups. Examples of peroxycarboxylic acids are chloroperoxybenzoic acids, peroxynaphthoic acid, peroxydecanoic acid, peroxylauric acid, peroxypalmitic acid, cyclohexanemonoperoxydicarboxylic acid, diperoxysebacic acid, $\alpha$-chloroperoxylauric acid, nitroperoxybenzoic acid, cyanoperoxybenzoic acid, p-peroxytoluic acid, m-peroxytoluic acid, p-tert-butylperoxybenzoic acid and 3-bromocyclohexaneperoxycarboxylic acid.

The following examples are given to illustrate the present invention, and are not deemed to be limitative thereof.

EXAMPLE 1

*Run A.—Recovery by the present process*

The following procedure was employed in producing m-chloroperoxybenzoic acid. A reaction mixture was made up containing 5.4 g. of sodium hydroxide and 17.8 g. of 85% by wt. potassium hydroxide dissolved in 100 mls. of water. This solution was cooled to 4° C., and 13.6 g. of 50% hydrogen peroxide was added followed by 84 g. of tert-butanol. Thereafter, 30 g. of m-chlorobenzoyl chloride was added slowly with constant stirring and the reaction permitted to proceed at from 2–4° C. for a period of 1 hr. The resulting solution weighed 252 g. and contained 27.1 g. of m-chloroperoxybenzoic acid and 1.35 g. of unreacted hydrogen peroxide. The mixture was acidified by adding 15 g. of 85% phosphoric acid; it then separated upon standing into two immiscible layers. The upper layer, upon being separated from the lower aqueous layer, weighed 141 g. and contained 26.8 g. of m-chloroperoxybenzoic acid, and minor amounts of inorganic salts.

This feed solution was charged into a distillation unit which consisted of a 3-neck flask equipped with a laboratory stirrer and connected to a condenser, distillate receiver and a vacuum pump. About 200 mls. of distilled water was charged into the distillation flask and heated. The vacuum pump was started and the pressure in the distillation unit was maintained at 30–32 mm. Hg. A small stream of the tert-butanol feed was charged into the water in the flask which was maintained at a temperature of 30° C. Tert-butanol vapors and water were removed overhead. The feed rate was maintained at from about 5–6 g. of solution per min. until all of the feed had been added to the flask. A slurry of m-chloroperoxybenzoic acid crystals were formed in the water. This slurry was removed from the distillation flask and filtered. Upon washing and drying the filtered precipitate, there was obtained 24.0 g. of a white crystalline material which analyzed 99.5% m-chloroperoxybenzoic acid and 0.5% m-chlorobenzoic acid.

In the distillate receiver, there was collected 122 g. of a liquid made up of 71.5 g. of tert-butanol and 50 g. of water.

The product was tested for storage stability by placing it in a container at room temperature. After 4 weeks" storage, the sample analyzed 99.4% m-chloroperoxybenzoic acid and 0.55% m-chlorobenzoic acid.

Run B.—Recovery by conventional distillation

This run was conducted with a duplicate mixture of Run A containing 27.5 g. of m-chloroperoxybenzoic acid in a tert-butanol layer.

The mixture was placed into a revolving evaporator equipped with a vacuum pump and heated by means of a control water bath. The pressure in the evaporator was reduced to about 4–8 mm. Hg and the average temperature of the distilling mixture was about 15° C. The tert-butanol was distilled off until approximately 80–90% was removed from the mixture. The peroxycarboxylic acid formed large sticky lumps which did not break up under severe agitation. These lumps were removed from the flask, crushed in a mortar and returned to the evaporator for additional distillation to remove the remainder of the solvent. After the tert-butanol had been removed overhead, there was obtained about 25.0 g. of a slight amber colored product which analyzed 42.4% m-chloroperoxybenzoic acid and 55% m-chlorobenzoic acid, the remainder being small amounts of inorganic impurities, i.e., salts. In this distillation, more than half of the peroxycarboxylic acid was decomposed during separation of the acid from the solvent.

EXAMPLE 2

The method described in Example 1, Run A, was repeated to produce p-chloroperoxybenzoic acid. Upon acidification and separation of the layers there was obtained 233 g. of a tert-butanol layer containing 28.1 g. of p-chloroperoxybenzoic acid, 0.44 g. of unreacted hydrogen peroxide and minor amounts of inorganic salts. The tert-butanol layer was charged into a distillation flask containing 400 mls. of distilled water at 30° C. and distilled under 30 mm. Hg. All of the tert-butanol and a portion of the water were distilled overhead and there remained in the flask 28.0 g. of a white crystalline material. This was found on analysis to be made up of 97.5% p-chloroperoxybenzoic acid and 2.5% p-chlorobenzoic acid. Recovery of the tert-butanol overhead was 87.0% of that charged into the still.

EXAMPLE 3

The procedure of Example 1, Run A, was repeated in order to produce 3-bromocyclohexane-peroxycarboxylic acid. The reaction was carried out by adding 38.6 g. of 3-bromocyclohexanecarbonyl chloride to a reaction mixture made up of 5.4 g. of sodium hydroxide, 17.8 g. of 85% potassium hydroxide, 100 g. of distilled water, 13.6 g. of 50% hydrogen peroxide and 84.0 g. of tertiary amyl alcohol. After reaction for 1 hr. at about 4° C., the mixture was acidified with phosphoric acid and there was added 30 additional grams of tertiary amyl alcohol. The resulting solution separated upon standing into two immiscible layers; the upper tertiary amyl alcohol layer weighed 160 g. and contained 35.7 g. of 3-bromocyclohexane-peroxycarboxylic acid and 0.24 g. of unreacted hydrogen peroxide plus minor amounts of inorganic salt. The tertiary amyl alcohol solution was charged into a distillation flask containing a pool of water and distilled under reduced pressure using the procedure described in Example 1, Run A. There was obtained from the aqueous slurry in the still, a white solid product weighing 36 g. which analyzed 94.2% 3-bromocyclohexane-peroxycarboxylic acid and 5.8% 3-bromocyclohexane-carboxylic acid. This product was found to be free of inorganic salt. The tertiary amyl alcohol and water which were condensed overhead separated into two layers, an upper tertiary alcohol layer and a lower aqueous layer.

EXAMPLE 4

The procedure employed in Example 3 was repeated to produce peroxylauric acid. In this reaction, 37.5 g. of lauroyl chloride was added to a reaction mixture containing 5.4 g. of sodium hydroxide, 17.8 g. of 85% potassium hydroxide, 100 g. of distilled water, 13.6 g. of 50% hydrogen peroxide, and 84.0 g. of tert-butanol. This mixture was reacted for 1 hr. at about 5° C. The mixture was acidified with sulfuric acid and an additional 30 g. of tert-butanol was added to the mixture to dissolve all the peroxy acid. The resulting solution separated upon standing into two immiscible layers; an upper tert-butanol layer weighing 158 g. was removed containing 33.7 g. of peroxylauric acid, 0.2 g. of unreacted hydrogen peroxide and minor amounts of inorganic salts. This tert-butanol solution was charged into a distillation flask containing an aqueous pool and distilled at a subatmospheric pressure of about 30 mm. Hg. Upon filtration of the aqueous slurry from the distillation flask, there was obtained 35 g. of white solids which analyzed 94.9% peroxylauric acid and 5.0% lauric acid.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A process for separating peroxycarboxylic acids which are solids at room temperature from a mixture containing a compound selected from the group consisting of tertiary amyl alcohol and tert-butanol, minor amounts of inorganic salts, and said peroxy acid, which comprises introducing said mixture into a distillation zone containing an aqueous pool, heating said aqueous pool to temperatures up to about 60° C. while maintaining said zone under sufficient subatmospheric pressure to boil the water in said aqueous pool, removing a vaporous mixture of said tertiary alcohol and water overhead, whereby said peroxycarboxylic acid crystallizes in said aqueous pool, removing the resultant aqueous slurry of said peroxycarboxylic acid from said distillation zone, and separating said peroxycarboxylic acid crystals from said slurry substantially free of said inorganic impurities and said tertiary alcohol.

2. Process of claim 1 in which said alcohol is tertiary amyl alcohol and said distillate separates into a tertiary amyl alcohol layer and a water layer, and said alcohol is recovered.

3. Process of claim 1 in which said alcohol is tert-butanol.

4. Process of claim 1 wherein said distillation is carried out at pot temperatures of from 15–40° C. and at subatmospheric pressures of from about 12 to about 60 mm. Hg.

5. Process of claim 1 wherein said acid is m-chloroperoxybenzoic acid.

References Cited by the Examiner

Carlson: in Technique of Organic Chemistry, vol. IV, 1951, pages 374–377.

Horsely: Azeotropic Data, 1952, pages 8–9.

LORRAINE A. WEINBERGER, *Primary Examiner.*

LEON ZITVER, *Examiner.*